Figure 1:
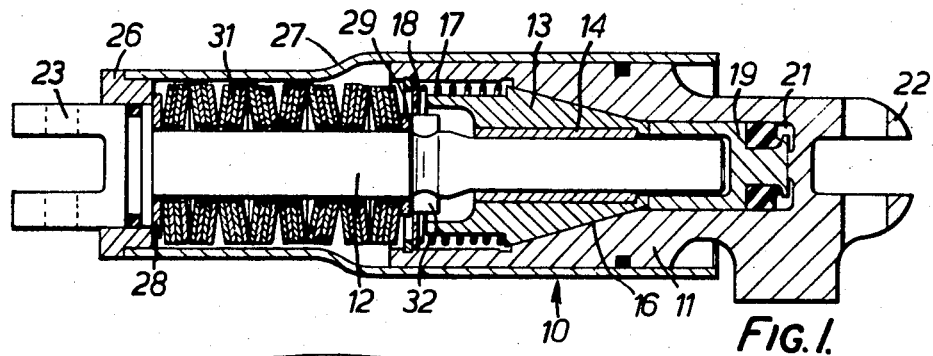

United States Patent
Fowler

[15] 3,682,280
[45] Aug. 8, 1972

[54] VEHICLE WHEEL BRAKES AND LOCKING MEANS THEREFOR

[72] Inventor: Richard T. Fowler, Kings Road, Tyseley, England

[22] Filed: April 13, 1970

[21] Appl. No.: 27,872

[30] Foreign Application Priority Data
April 11, 1969 Great Britain..........18,765/69

[52] U.S. Cl. .....................188/265, 192/114, 303/89
[51] Int. Cl.............................................F16d 63/00
[58] Field of Search..........188/265; 192/114; 303/89

[56] References Cited
UNITED STATES PATENTS 3,205,020 9/1965 Schubert...................303/89 X
3,203,513 8/1965 Allen.......................303/89 X
3,384,205 5/1968 Chouings...............188/364 X FOREIGN PATENTS OR APPLICATIONS
1,162,215 1/1964 Germany..................188/265

Primary Examiner—George E. A. Halvosa
Attorney—Scrivener, Parker, Scrivener and Clarke

[57] ABSTRACT

The locking unit has an extensible strut comprising telescopic shaft and housing parts which can be locked against relative axial movement by a collet type clutch comprising a plurality of axially movable wedge elements. These elements are spring biassed into wedging locking engagement between the strut parts but can be displaced axially, to free the parts by a piston projecting from a chamber formed in the housing part. A resilient device protects the strut against overload due to compressive forces.

6 Claims, 5 Drawing Figures

VEHICLE WHEEL BRAKES AND LOCKING MEANS THEREFOR

This invention relates to vehicle wheel brakes incorporating automatic locking means effective to hold the brake shoes or other friction members in braking engagement with a drum or other brake rotor.

The specification of co-pending U.S. application Ser. No. 873,316 filed Nov. 3, 1969 describes a vehicle wheel brake comprising a fixed structure, a friction element movably mounted on the fixed structure for movement into and out of engagement with a brake rotor, a power operated service brake actuator for applying the friction element, locking means acting on the friction element independently of the said actuator and having a first operative condition in which it automatically follows up movement of the friction element and a second operative condition in which it locks the element against movement away from the brake rotor, and a driver operated control for selecting the first and second operative conditions of the locking means.

According to the present invention, there is provided locking means for use in a brake of this form, the locking means comprising a strut of adjustable length, a collet type clutch for locking and unlocking two parts of the strut, for relative axial movement and a fluid pressure operated motor controlling actuation of the said clutch.

In a presently preferred constructional form of the invention which is described in detail below, one part of the strut comprises a housing and the other a shaft telescopically received in the housing, and the clutch comprises a plurality of wedge-like elements, which are movable axially between an engaged position in which they lack the strut parts together against relative axial movement, and a disengaged position in which they free the strut parts for such movement.

The fluid pressure operated motor preferably comprises a piston located in a cylinder formed in the housing part and arranged to effect axial displacement in one direction of the collet parts, which are resiliently biased in the opposite direction towards the disengaged position.

Preferably, a load transmitting member is coupled to the strut through the intermediary of resilient means under an initial preload and adapted to transmit forces from the said member to the strut without substantial deflection, but to deflect under a predetermined load, whereby to limit the load transmitted to the strut.

Figure 2:
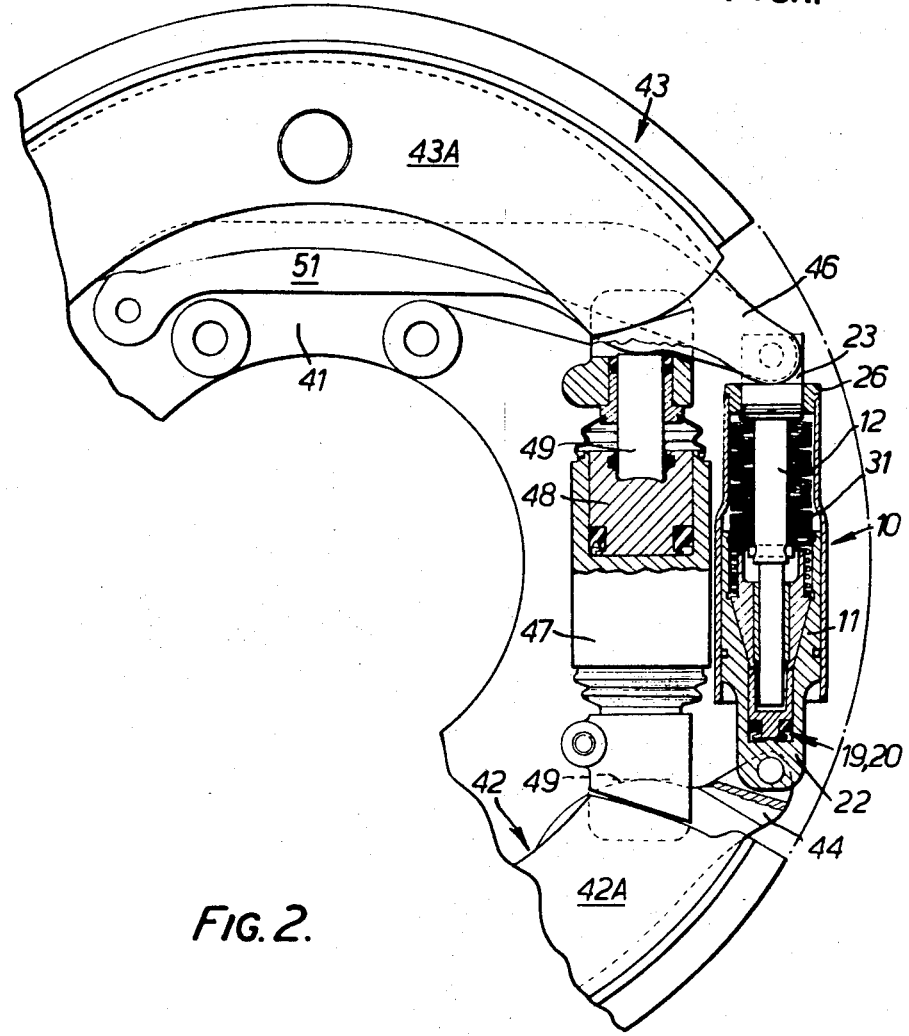
Figure 3:
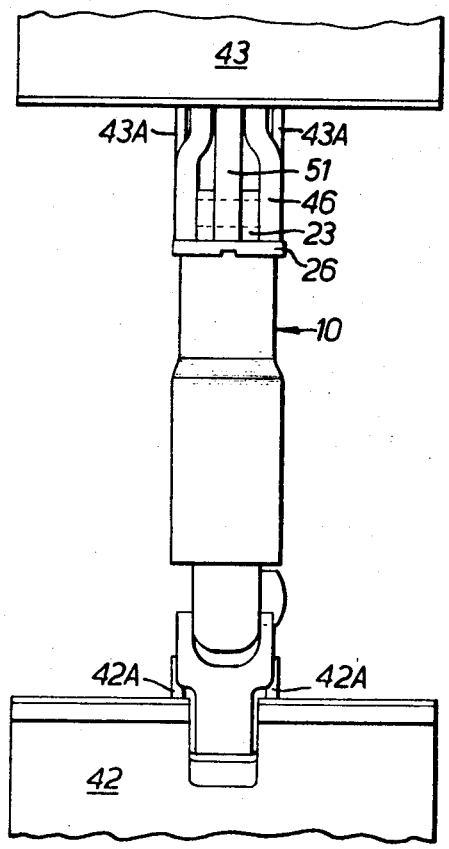
Figure 5:
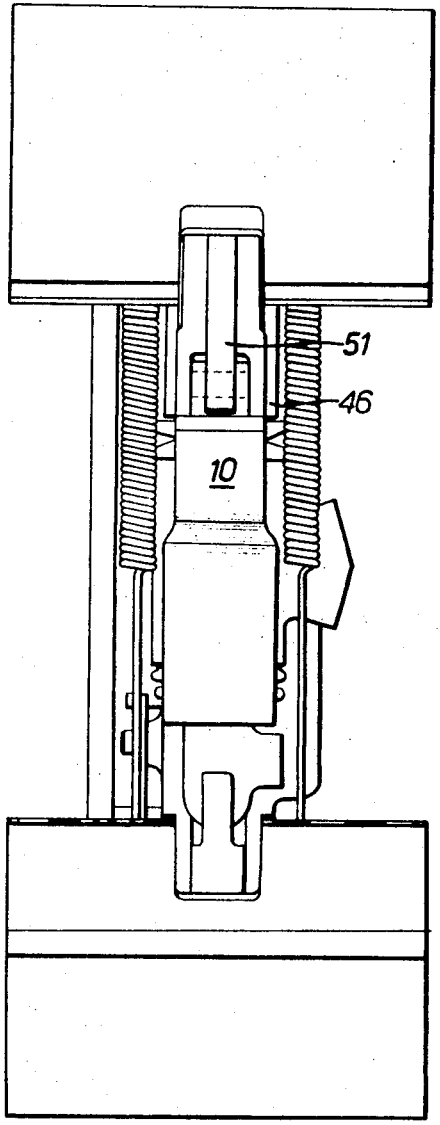
Figure 4:
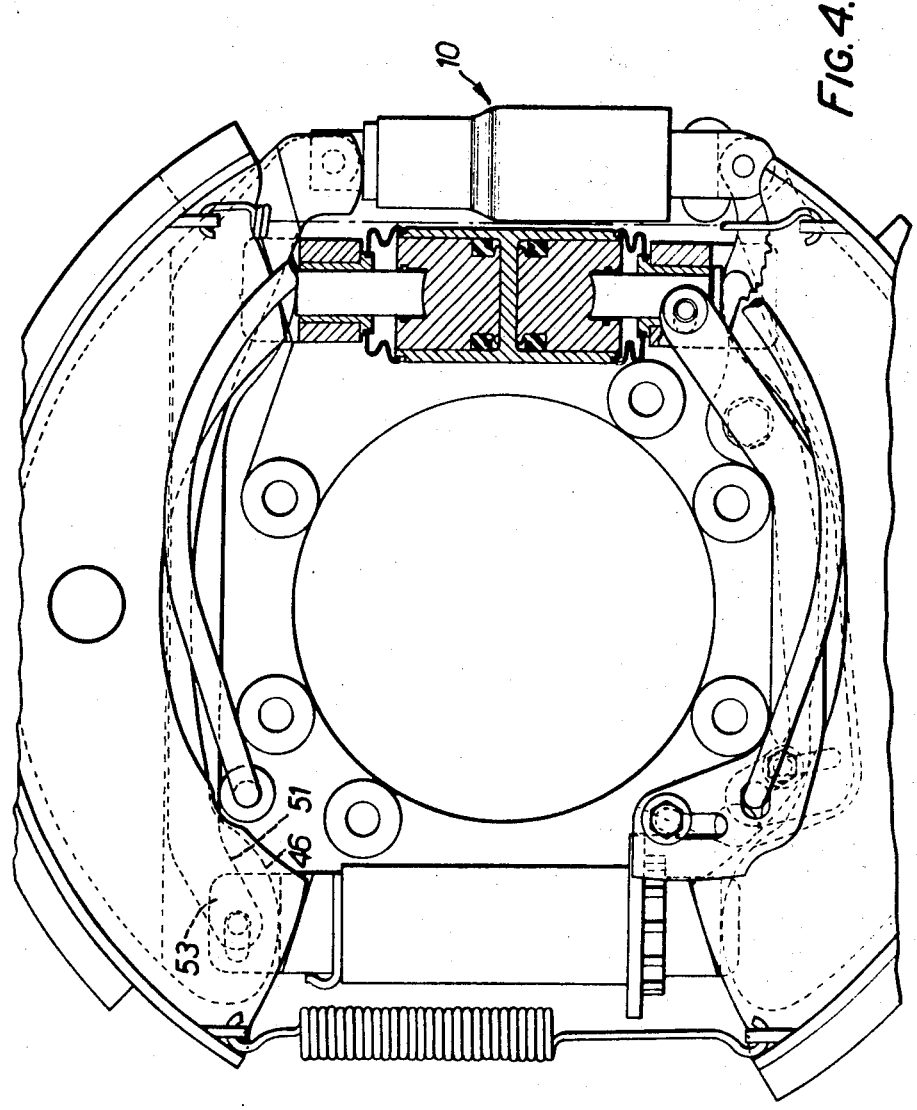

One particular form of locking means in accordance with the invention and two drum brakes incorporating the same will now be described, by way of example only, with reference to the accompanying drawings, in which:

FIG. 1 is an axial cross-section of the locking means;

FIGS. 2 and 3 are a partial sectional end elevation and a side elevation of a drum brake; and FIGS. 4 and 5 are views corresponding to FIGS. 2 and 3 of another form of drum brake.

The locking means shown in FIG. 1 takes the form of a self-contained lock unit 10 comprising a main body part or housing 11 in which is received a shaft 12. The housing and shaft form two relatively movable parts of an adjustable length strut, and between the parts is arranged a collet-type friction clutch comprising a number (preferably three) of wedge-shaped clutch elements 13, each having an internal lining 14 of friction material to secure good frictional engagement with the shaft 12. The outer surfaces of the clutch elements are part conical to co-operate with a frusto-conical female clutch face 16 formed in the housing 11. The clutch elements are resiliently biased into frictional locking engagement between the strut parts by a coil compression spring 17 working at one end directly on the clutch elements and at the other end against a fixed abutment formed by a collar 18 in the housing 11. Release of the clutch is controlled by means of a fluid pressure actuated motor comprising a piston 19 working in a cylinder 21 formed in the housing. Fluid inlet ports (not shown) enable fluid (hydraulic or pneumatic) to be fed under pressure to the pressure chamber of the cylinder to force the piston outwardly of the cylinder. The distal end of the piston abuts the clutch elements 13, forcing the elements to their disengaged position against the action of the spring 17. Thus, when fluid pressure is supplied to motor 19, 21, the clutch is disengaged to permit free relative axial movement of the strut parts 11 and 12.

The end of the housing 11 adjacent cylinder 21 is formed with a slotted eye-connector 22 or otherwise suitably adapted for thrust transmitting connection to a brake structure, and the further end of shaft 12 is provided with a slotted eye connector 23. The connector 24 has a sealed, sliding connection with the interior of an end cap 26, to which is secured a tubular dirt shield 27 having sealed, sliding engagement over the housing 11.

Mounted loosely on the shaft 12 are two spring abutment collars 28 and 29, between which is arranged a pack of frusto-conically dished spring washers (Bellville washers) 31 arranged in groups of four, each group being reversed with respect to its conicity, relative to the adjacent group or groups. The spring washers are preloaded in compression during assembly, the thrusts transmitted to the collars 28 and 29 being taken by the connector end of shaft 12 and a pin 32 through the shaft respectively. The spring washers provide a resilient preload against relative movement in one direction between the end cap 26 and the shaft, but can yield or deflect by flattening under a predetermined minimum load to permit a degree of such relative movement. Other resilient means could, of course, be employed for this purpose, such as a coil or solid rubber spring, but the dished spring washers provide a very compact and economic means of obtaining a required spring rate. Another obvious modification of the lock unit would be to form the housing of separated parts welded or otherwise secured together.

The above described lock unit 10 is incorporated in each of the two brakes described below.

The brake of FIGS. 2 and 3 is of the general form described in British Patent Specification 972,240, and comprises a back plate 41, a pair of arcuate brake shoes 42 and 43, each having parallel webs 42A, 43A, and a carrier 44, 46 associated with each shoe and arranged to effect acutation thereof through the intermediary of a thrust member, not shown, at the midpoint of the shoe. A service brake actuator comprises a double ended hydraulic slave cylinder 47, having opposed pistons 48 abutting respective tappets 49, the lower of which, as drawn, abuts the adjacent end of brake shoe carrier 44. The carrier 44 is pinned to the respective connector 22 of the lock unit, and the carrier 46 abuts the end cap 26 of the lock unit. Pinned to connector 23 is one end of a lever 51, the other end of which is pivotally connected to the back plate 41. Intermediate its ends the lever abuts the adjacent tappet 49.

During normal, service brake actuation, the carrier 44 and shoe 42 are forced outwardly into engagement with the brake drum, and the lever 51 is rotated (anticlockwise in FIG. 2) taking with it the shaft 12 of the lock unit 10, this movement being transmitted by the spring washers 31 to the end cap 26, carrier 46 and brake shoe 43. The carrier 44 moves in the opposite direction with its brake shoe, and carries with it the housing 11. This relative movement of the housing and shaft is possible because fluid pressure is constantly supplied to the motor 19, 20 which holds the friction clutch of the lock unit disengaged. However, if the driver wishes to operate the lock unit to act as a parking brake, he applies the brakes in the manner described above and then releases the fluid pressure in the lock unit (by manipulation of a control valve) before releasing the service brake actuator.

The lock unit strut is thus locked in its extended position by virtue of engagement of the friction clutch, and resists retraction of the shoes by the action of the brake return springs. The return spring force is transmitted through the carrier 44 to the end cap 26 and through the spring washers 31 to the shaft 12. Thus, the thrust transmitted to the shaft 12 in the "brakes locked" condition is limited to the maximum load which can be transmitted by the spring washers without substantial deflection thereof.

If the lock is operated when the drum is in an overheated condition, subsequent cooling and contraction of the drum will apply an additional force tending to return the shoes inwardly. The pack of spring washers is designed to accommodate this contraction by partial deflection only, i.e. under the maximum contraction of the drum the pack of washers is not fully compressed so as to form a solid strut in itself.

Under normal conditions the lock is releasable by operation of the motor 19, 21, but if substantial drum contraction has taken place, the service brake is operated to press lever 51 and shaft 12 outwardly in one direction and the housing 11 in the opposite direction. This causes a further compression of the spring washer 31 and relieves the strut, and therefore the clutch, of its axial load. The clutch can then be disengaged by the action of motor 19, 21.

Construction and operation of the brake shown in FIGS. 4 and 5 is generally similar to that described above, but in this case, the lever 51 is pivoted not to the back plate but to an adjustable shoe abutment 53 which also forms a fulcrum for the carrier 46, so that the angular movement of the lever and carrier during brake actuation is more nearly identical.

In the brakes described above, there is but one brake actuator which acts between one pair of adjacent shoe ends, one pair of abutments (preferably automatically adjustable) between the opposite shoe ends, and one lock unit. If the brake had two actuators and two sets of abutments there would be two lock units.

The lock unit described above can, of course, be incorporated in brakes other than those specifically described above and could, for example, act between a back plate and a brake shoe, or directly between adjacent ends of a pair of brake shoes.

In each case, the maximum braking force that can be applied to the brake shoes is limited to that which can be transmitted by the spring washers 31, the pre-load in which is accordingly designed to correspond to a given deceleration value. In the event of an exceptionally heavy braking pressure being developed, as in an emergency stop, the washers can, of course deflect under the load applied to them.

The particular brake constructions illustrated in FIGS. 2 to 5 form the subject matter of my co-pending application of even date.

I claim:

1. In or for a vehicle wheel brake comprising a brake rotor, a fixed structure, a friction element movably mounted on said structure for movement into and out of engagement with said brake rotor, a power operated service brake actuator for applying said friction element to said rotor and selectively operable locking means for holding said friction element applied to said rotor, the improvement in which said locking means comprises extensible strut means, said extensible strut means comprising essentially a housing part and a shaft part telescopically received in said housing part, collect type clutch means comprising a plurality of axially movable wedge elements for locking and unlocking said strut means, a fluid pressure operated motor controlling operation of said clutch means, a load transmitting member mounted for axial movement relative to said strut means, resilient means coupling said member and said strut means together in thrust transmitting relationship, a pair of axially spaced, fixed abutments on said shaft part, and a pair of opposed axially movable collars on said shaft part between and engageable with respective ones of said abutments, said collars trapping and pre-loading said resilient means therebetween, said load transmitting member being constituted by an end cap engageable with one of said collars and movable axially with respect to said shaft part, said preloaded resilient means being adapted to transmit compressive loads up to a predetermined value without substantial deflection and thereafter to deflect to permit relative axial movement between said thrust transmitting member and said strut part.

2. The improved locking unit of claim 1 comprising a tubular dirt shield carried by said end cap and having sliding, sealed engagement over said housing part.

3. In or for a vehicle wheel brake comprising a brake rotor, a fixed structure, a friction element movably mounted on said structure for movement into and out of engagement with said brake rotor, a power operated service brake actuator for applying said friction element to said rotor and selectively operable locking means for holding said friction element applied to said rotor, the improvement in which said locking means comprises extensible strut means separate from the actuator including a housing part and a shaft part telescopically received in said housing part, means operatively connecting one of said parts to said friction element and the other of said parts to a reaction member, clutch means comprising a plurality of wedge elements arranged to wedge in said housing part and frictionally engage with said shaft part to lock the same in extended position relative to said housing part, resilient means normally urging said wedge elements to locking position, a fluid pressure operated motor operably connected to said wedge elements for moving the same to their unlocking position, and second resilient means acting between said strut means and said friction element and constructed and arranged to limit the reaction load transmitted to said strut means by said friction element to a level such that the load exerted on said wedge elements is not in excess of available pressure force which may be exerted on said fluid pressure operated motor to move said wedge elements from their locked to their unlocked position.

4. The structure of claim 3 including a load transmitting member mounted for axial movement relative to said strut means and wherein said second resilient means couples said member and said strut means together in thrust transmitting relationship, said resilient means being pre-loaded and adapted to transmit compressive loads up to a predetermined value without substantial deflection and thereafter to deflect to permit relative axial movement between said thrust transmitting member and said strut part.

5. The structure of claim 4 including a pair of axially spaced, fixed abutments on said shaft part, a pair of opposed axially movable collars on said shaft part between and engageable with respective ones of said abutments, said collars trapping and pre-loading said second resilient means therebetween, and a load transmitting member constituted by an end cap engageable with one of said collars and movable axially with respect to said shaft part.

6. The structure of claim 5 comprising a tubular dirt shield carried by said end cap and having sliding, sealed engagement over said housing part.

* * * * *

UNITED STATES PATENT OFFICE
CERTIFICATE OF CORRECTION

Patent No. 3,682,280                Dated   August 8, 1972

Inventor(s)  Richard T. Fowler

It is certified that error appears in the above-identified patent and that said Letters Patent are hereby corrected as shown below:

On the cover sheet, insert -- [73] Assignee Girling Limited, Birmingham, England -- .

Signed and sealed this 1st day of May 1973.

(SEAL)
Attest:

EDWARD M. FLETCHER, JR.                ROBERT GOTTSCHALK
Attesting Officer                      Commissioner of Patents